Dec. 29, 1959   J. L. BUIE ET AL   2,919,437
TELEMETERING APPARATUS
Filed May 5, 1954   3 Sheets-Sheet 1

GERHARD H. DeWITZ
JAMES L. BUIE
INVENTORS

BY
THEIR ATTORNEY

Dec. 29, 1959     J. L. BUIE ET AL     2,919,437
TELEMETERING APPARATUS

Filed May 5, 1954     3 Sheets-Sheet 2

GERHARD H. DeWITZ
JAMES L. BUIE
*INVENTORS*

BY *(signature)*

THEIR ATTORNEY

Dec. 29, 1959  J. L. BUIE ET AL  2,919,437
TELEMETERING APPARATUS

Filed May 5, 1954  3 Sheets-Sheet 3

GERHARD H. DeWITZ
JAMES L. BUIE
  INVENTOR.

BY
  THEIR ATTORNEY

United States Patent Office 2,919,437
Patented Dec. 29, 1959

2,919,437

TELEMETERING APPARATUS

James L. Buie, Sun Valley, Calif., and Gerhard H. De Witz, Westport, Conn., assignors to Hoffman Electronics Corporation, a corporation of California Application May 5, 1954, Serial No. 427,691

6 Claims. (Cl. 340—208)

This invention is related to telemetering systems and, more particularly, to an improved apparatus designed to detect desired information and convert such information into an intelligible electric signal preparatory to transmission and reception and subsequent conversion of this information into a visible and intelligible display.

In the past many attempts have been made to design detector and converter apparatus which is suitable for employment in telemetering system of a type which employ the transmission and reception of a signal having continuous frequency variation. Invariably certain problems are encountered which render telemetering apparatus presently employed in such systems deficient in some respect. In systems where the value of a variable capacitor is determined by the sensing system, the plates of this variable capacitor generally have peripheries shaped similarly to the numeral "6," with the two end-portions of the "6" joined by a straight line portion. As the plates of this capacitor are progressively meshed and unmeshed, a large "flyback" error is introduced in the region where the capacity changes at a high rate from its minimum value to its maximum value, such error being of the order of 20°. Further, conventional converter and detector units have been found to be of low accuracy and are physically large and heavy. Most are liquid filled, resulting in high capacity but sporadic operation due to changes in temperature of the liquid and consequent changes in dielectric constant of the liquid which fills the regions between the condenser plates. In addition, enmeshed capacitor plates require two-bearing operation, which, in the case of the application of such principles to compass problems, results in increased errors from tilting and the like.

Therefore, it is an object of this invention to provide for such telemetering systems apparatus exhibiting materially increased accuracy.

It is an additional object of this invention to provide telemetering apparatus which will exhibit optimum reliability, will be of light weight, and will have a low manufacturing cost.

According to this invention, a movable indicator or sensing element having a reference housing is disposed adjacent a terminated delay line and is mechanically coupled to a probe associated with the delay line, such probe being movable along the delay line with slight force, in response to movements of the indicator. Movement of the probe varies the delay in the line and associated circuitry, and produces a voltage indicative of such delay. Such voltage may be applied to a remote meter which may be calibrated in terms of the original information.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
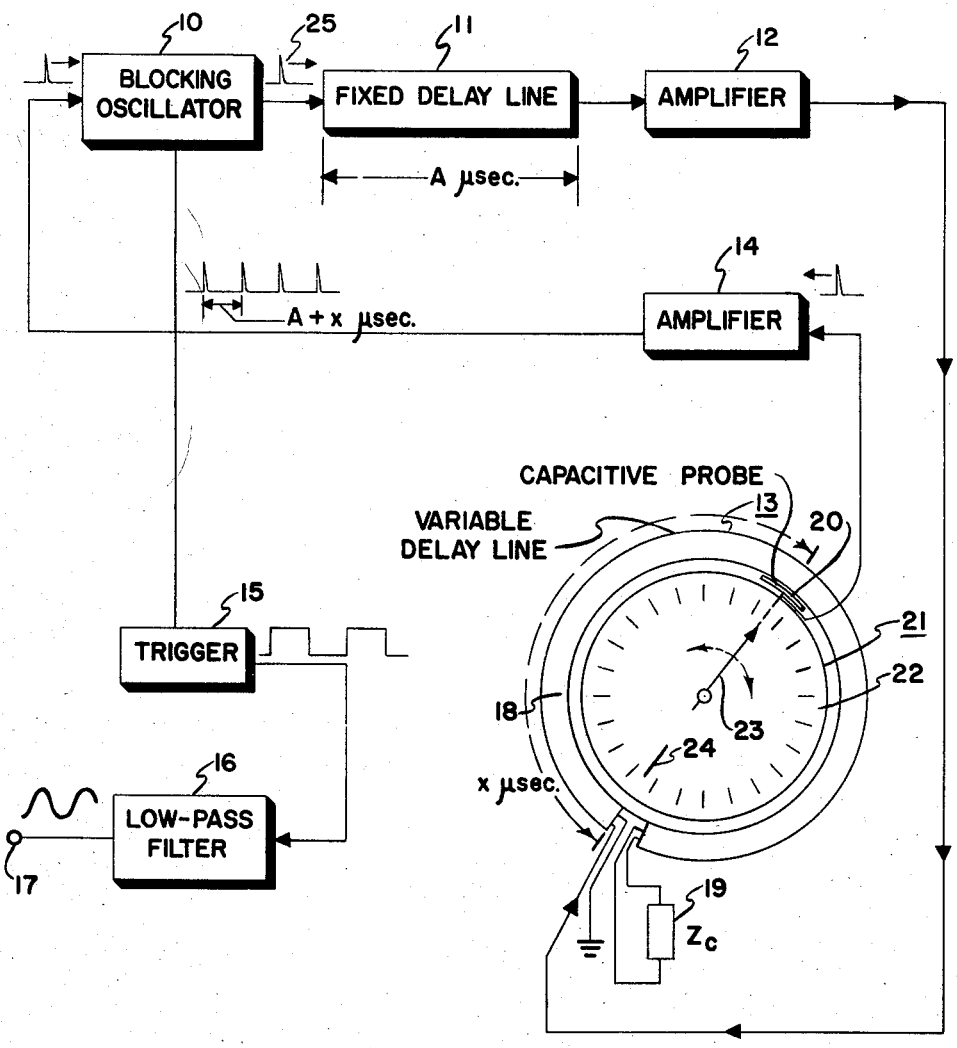
Figure 1 is a diagram, partially in block form, of one embodiment of a telemetering circuit and apparatus associated therewith, according to this invention.

In Figure 1, blocking oscillator or pulse generator 10 has associated therewith a feedback loop and an output circuit. Blocking oscillator 10 may take the form of the biased blocking oscillator illustrated in Figures 18–20 at page 406 of "Electron Tube Circuits" by Seely, published by McGraw-Hill, New York, published in 1950 (first edition), with the feedback loop being coupled to the grid of the oscillator tube. The feedback loop consists of fixed delay line 11, amplifier 12, variable delay line 13, which in this embodiment is disposed in ring form, and amplifier 14, coupled in series, in that order, between the output and input terminals of pulse generator 10. The output terminals of pulse generator 10 are also coupled to the input terminals of triggering stage 15. The output circuit of triggering stage 15 is coupled through low-pass filter 16 to output terminal 17.

The following references indicate, respectively, the physical form which fixed delay line 11, amplifier 12, variable delay line 13, amplifier 14, trigger 15, and low-pass filter 16 may take: Figure 51(b) at page 158, "Radio Engineering Handbook" by Henney, published by McGraw-Hill, New York, published in 1941 (third edition); Figures 6–17 at page 252, "Radio Engineering" by Terman, published by McGraw-Hill, New York, published in 1947 (third edition); (present disclosure); Figures 6–17 at page 252, "Radio Engineering" by Terman (op. cit.); Figures 19–14 at page 420 of "Electron Tube Circuits" by Seely (op. cit.); and Figure 4.49(c) at page 181 of "Radiotron Designer's Handbook" by Langford-Smith, published by Wireless Press (reproduced and distributed by Radio Corporation of America), 1952 (fourth edition).

Variable delay line 13 is composed of a delay line portion 18 and capacitive probe 20. Delay line portion 18, in this embodiment, has a circular configuration and is terminated at one end in its characteristic impedance. Indicating device 21 having base portion 22 and indicator 23, is disposed within the circular area outlined by variable delay line 13. Capacitive probe 20 is ganged with indicator 23 and, therefore, as indicator 23 rotates capacitive probe 20 will move progressively about its circular path in proximity to one surface of variable delay line portion 18.

The circuit of Figure 1 operates as follows. Let it be considered that an object is to generate a signal the frequency of which is a linear function of the relative angular position of indicator 23 of indicating device 21 with respect to reference line 24 upon base portion 22. As has been noted, in this embodiment delay line portion 18 has a circular configuration and lies along the periphery of indicating device 21. To prevent pulse reflection and consequent spurious responses, delay line portion 18 is terminated at one end by impedance 19, the magnitude of which is equal to the characteristic impedance of delay line 18. Probe 20 is mechanically coupled to indicator 23 and changes its position as indicator 23 rotates. A pulse entering the input terminals of the delay line portion 18 will experience a time delay proportional to the path distance between the input terminal of delay line portion 18 and the instantaneous position of probe 20.

Figure 5:
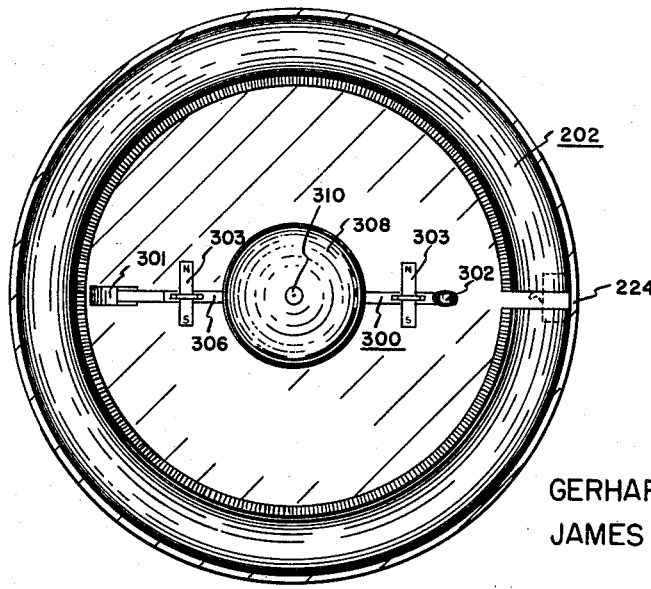
Figure 5 is a view taken along the line 5—5 in Figure 3.

Blocking oscillator or pulse generator 10 generates initial voltage pulse 25, which experiences a fixed time delay upon its passage through fixed delay line 11. Let this constant time delay be designated as A microseconds. In this discussion the fixed, negligible time delays experienced by the pulses in passing through amplifiers 12 and 14 are ignored. Amplifier 12 is designed to reshape the pulses after their passage through fixed delay line 11. The output pulses from amplifier 12 will experience a time delay of $x$ microseconds upon passage through delay line portion 13. The value of $x$ will be determined by the position of probe 20 along delay line portion 13 for it is that probe which taps off the initial pulse and sends it to amplifier 14 for pulse shaping. The output pulse from amplifier 14 is fed to the input terminals of blocking oscillator 10 to trigger blocking oscillator 10 for generation of the next output pulse. Accordingly, blocking oscillator 10 will generate a pulse train, the time-distance between pulses equaling A microseconds plus $x$ microseconds. It is seen that the pulse repetition frequency of the output pulse train generated by blocking oscillator 10 will be dependent upon the value of $x$, and, consequently, upon the instantaneous position of probe 20. The pulse train from blocking oscillator 10 is subsequently fed to a triggering circuit, to produce a train of square waves, and finally through low-pass filter 16 to produce a signal which exhibits a frequency corresponding to one-half the pulse repetition frequency of the pulse train generated by blocking oscillator 10. Low-pass filter 16 suppresses all of the high harmonics in order to pass an essentially sinusoidal output wave form of varying frequency. This output signal, which appears at terminal 17, may subsequently be superimposed upon a carrier wave in conventional fashion and transmitted to a remote point by wire or radio.

Where the transmission is by radio, the output signal from output terminal 17 in Figure 1 may comprise the input signal to a conventional frequency modulation transmitter such as that represented in simplified form at Figure 15–5 on page 740, "Radio Engineering" by Terman (op cit.).

The telemetering receiving apparatus may be conventional, in part, and employs a first detector, to remove the carrier, and a frequency modulation detector to convert a signal having variable frequency into a signal having corresponding variable amplitude. (The receiver found in Figures 15–16 at page 753 of "Radio Engineering" by Terman (op. cit.), is a typical frequency modulation receiver which might be employed with the present invention.) Such a signal of varying amplitude is readily employable to produce upon an oscilloscope or other display device a visual trace, the instantaneous length of which is controlled by the instantaneous frequency of the frequency modulated signal from the telemetering transmitter, and hence, by the instantaneous angular position of indicator 23 of indicating device 21 with respect to reference line 24 upon base portion 22.

Figure 2:
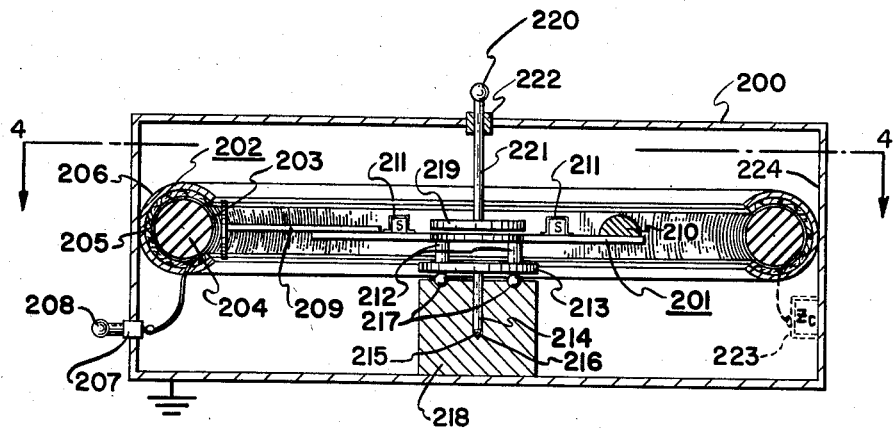
Figure 2 is an axial section view of telemetering apparatus usable in the circuit of Figure 1.

Figure 2 shows an axial section view of telemetering apparatus embodying this invention applied to a magnetic compass. Cylindrical housing 200 for indicating device 201 has delay line 202 attached to inner side surface 224 as shown at 203. Delay line 202 is composed of winding 203, winding core 204, insulation 205 and outer shell 206. Winding 203 (composed of a copper alloy, for example) and core 204 (composed of iron, for example) provide the required line inductance. Winding 203 and outer shell 206 (composed of an aluminum alloy, for example), separated by dielectric insulator 205 (composed of mica, for example), provide distributed capacitance. One terminal of winding 203 is grounded through characteristic impedance 223 to cylindrical case 200. The other terminal of winding 203 is coupled through insulating block 207 to output terminal 208. Indicating device 201, having capacitive probe 209, counter-balance 210, bar magnets 211, supports 212, and table 213, are supported by shaft 214, having carbon tip 215 and jewel bearing 216, and ball bearings 217, mounted upon insulating block 218. Capacitive plate 219, connected to output terminal 220 by means of connecting rod 221 passing through insulating block 222, permits extraction of electrical information corresponding to the positioning of indicating device 201 without contacts, and thus completes the circuit for the telemetering apparatus.

The conductive elements of the apparatus of Figure 2, such as probe 209, plate 219, rod 221, and terminal 220 may be fabricated from a suitable aluminum alloy, if desired.

The apparatus shown in Figure 2 operates as follows. Table 213 of indicating device 201 is free to rotate about its axis, and hence indicating device 201 will position itself uniquely by reason of the alignment of bar magnets 211 with the Magnetic North. Suppose now that cylindrical case 200 is rotated about its axis by means of an external force. Bar magnets 211 will remain aligned with the earth's magnetic field, and hence cylindrical case 200 will rotate about indicating device 201. Accordingly, capacitive probe 209 will move along delay line 202. Referring now to Figure 1 and the discussion thereof, the telemetering circuit will produce an output signal at terminal 17 (terminal 220 in Figure 2) which will be sinusoidal and which will have a frequency which is a function of the position of the sensing element. Measurement of this frequency or use of a discriminator or other converter will allow direct remote presentation in the telemeter receiving and displaying apparatus.

In many cases, especially in the telemetering of compass information, it is desirable to provide two degrees of freedom of motion for the sensing element in order to reduce errors caused by three dimensional components of the force of which the magnitude in one plane is to be indicated.

Figure 3:
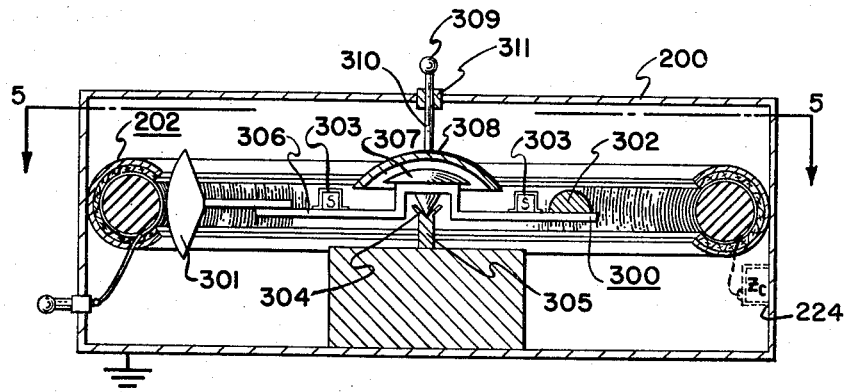
Figure 3 is a similar view of additional metering apparatus usable in the circuit of Figure 1.

In Figure 3, cylindrical case 200 has a delay line configuration similar to that of a telemetering apparatus as shown and described in Figure 2. Indicating device 300 includes capacitive probe 301, counter-balance weight 302, small bar magnets 303, jewel bearing 304, support shaft 305, base portion 306, and spherical portion 307. Associated with spherical portion 307 is matching spherical portion 308 which is coupled to output terminal 309 by shaft 310 passing through insulating block 311. Probe 301, spherical portions 307 and 308, shaft 310 and terminal 309 may be fabricated from a suitable aluminum alloy, if desired.

The apparatus shown in Figure 3 operates as follows. It is apparent that the tipping of housing 200 will not affect the alignment of indicating device 300, by reason of jewel bearing 304 and the effective coupling capacitor composed of spherical segments 307 and 308. In practice, capacitive probe 301 will have an unique size and shape with respect to delay line 202, in order to provide a definite capacitance between delay line 202 and probe 301 which is independent of tipping. Otherwise the apparatus shown in Figure 3 will operate in the same fashion as the apparatus of Figure 2.

Figure 4:
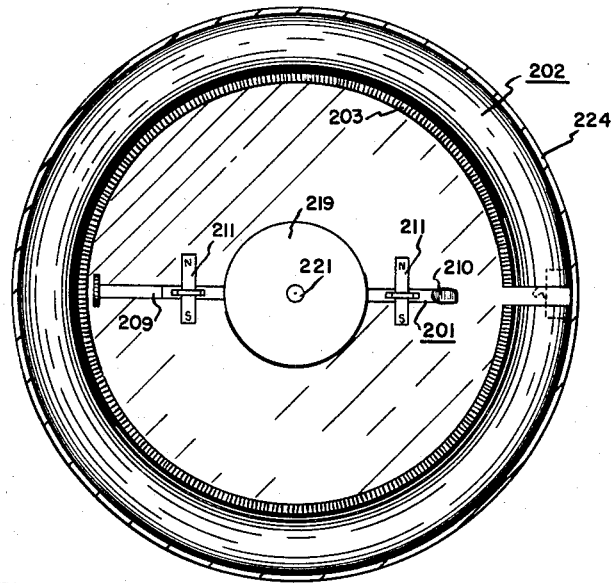
Figure 4 is a view taken along the line 4—4 in Figure 2.

Figures 4 and 5 are top views (partly in cross-section) of the apparatus shown in Figures 2 and 3, respectively, and require no further explanation.

Thus, the invention described eliminates previous defects encountered in conventional telemetering apparatus in that the present apparatus is of light weight, of high accuracy, and lends itself to low-cost manufacture, is not responsive to tipping of the indicator housing, and also eliminates the employment of liquid-filled housing units employing heater elements.

While particular embodiments of the present invention have been shown and described, it will be obvious to those skilled in the art that changes and modifications may be made without departing from this invention in its broader aspects, and, therefore, the aim in the ap-

We claim:

1. An information detecting apparatus for employment in telemetering systems including, in combination, a blocking oscillator having a feedback loop and an output circuit; said feedback loop of said blocking oscillator consisting of a fixed delay line coupled to the output side of said oscillator, a first amplifier stage coupled to said fixed delay line, a variable delay line coupled to said first amplifier stage, a second amplifier stage coupled to said variable delay line, and said second amplifier stage coupled to the input side of said blocking oscillator; said output circuit of said blocking oscillator consisting of a triggering circuit being coupled to the output side of said blocking oscillator, and a filter coupled to said triggering circuit; said variable delay line being composed of a conventional delay line terminated in its characteristic impedance; said variable delay line having circular configuration and a movable probe disposed in proximity with said circular configuration; a device having indicating means, said device being disposed within the circular configuraton of said variable delay line, and said probe of said variable delay line being ganged with said indicating means to travel around said circular configuration of said variable delay line.

2. An information detecting apparatus for employment in telemetering systems including, in combination, a blocking oscillator having a feedback loop and an output circuit; said feedback loop of said blocking oscillator consisting of a fixed delay line coupled to the output side of said oscillator, a first amplifier stage coupled to said fixed delay line, a variable delay line coupled to said first amplifier stage, a second amplifier stage coupled to said variable delay line, and said second amplifier stage coupled to the input side of said blocking oscillator; said output circuit of said blocking oscillator consisting of a triggering circuit being coupled to the output side of said blocking oscillator, and a filter coupled to said triggering circuit; said variable delay line being composed of a conventional delay line terminated in its characteristic impedance; said variable delay line having a circular configuration and a movable probe disposed in proximity with said circular configuration; a rotatable device having indicating means, said device being disposed within the circular configuration of said variable delay line, and said probe of said variable delay line being ganged to said indicating means of said variable delay line.

3. In a telemetering transmitter, in combination, a pulse oscillator having input and output channels and a feedback path connected from said output channel to said input channel, whereby to produce in said output channel a train of pulses time-spaced in accordance with the time delay characteristic of said feedback path, a delay line including at least one fixed terminal and an energy probe mounted for movement along the length of said line in energy-transferring relationship thereto, said terminal and said probe being connected in series in said feedback path, whereby to vary the effective time delay characteristic of said feedback path and thereby the time spacing of said pulse train; means for connecting said probe to the movable indicating element of an instrument to position the probe along said line in accordance with the position of said element, and means connected to the output channel of said oscillator for generating a telemetering signal representative of the time spacing of pulses in said output channel.

4. The combination in accordance with claim 3, in which said delay line is substantially of circular configuration, and in which said probe is mounted for rotational movement along said line with respect to the center of said delay line.

5. The combination in accordance with claim 3, in which said delay line includes a termination impedance equal to the characteristic impedance of said line, said termination impedance being connected across said line at a point remote from said fixed terminal.

6. The combination of claim 3, in which said energy probe comprises a conductive element maintained in capacitive relation to said delay line.

References Cited in the file of this patent

UNITED STATES PATENTS

| | | |
|---|---|---|
| 1,636,502 | Fessenden | July 19, 1927 |
| 1,671,143 | Campbell | May 29, 1928 |
| 1,809,683 | Fitzgerald | June 9, 1931 |
| 2,131,084 | Young | Sept. 27, 1938 |
| 2,172,918 | Watts | Sept. 12, 1939 |
| 2,280,678 | Waymouth | Apr. 21, 1942 |
| 2,346,800 | Usselman | Apr. 18, 1944 |
| 2,387,496 | Cornelius | Oct. 23, 1945 |
| 2,525,893 | Gloess | Oct. 17, 1950 |
| 2,664,556 | Sontheimer | Dec. 29, 1953 |
| 2,674,734 | McCreary | Apr. 6, 1954 |
| 2,729,795 | Hoeppner | Jan. 3, 1956 |
| 2,742,613 | Sontheimer | Apr. 17, 1956 |

FOREIGN PATENTS

| | | |
|---|---|---|
| 129,224 | Australia | Sept. 21, 1948 |